United States Patent [19]
Gilinson, Jr.

[11] 3,823,990
[45] July 16, 1974

[54] CAPACITIVE-INDUCTIVE BRIDGE TYPE ELECTRICAL SUSPENSION
[75] Inventor: Philip J. Gilinson, Jr., Chelmsford, Mass.
[73] Assignee: Massachusetts Institute of Technology, Cambridge, Mass.
[22] Filed: Oct. 10, 1972
[21] Appl. No.: 296,146

[52] U.S. Cl. .................................. 308/10, 74/5.7
[51] Int. Cl. ............................................ F16c 39/06
[58] Field of Search .......................... 308/10; 74/5.7

[56] References Cited
UNITED STATES PATENTS
| 3,184,271 | 5/1965 | Gilinson | 308/10 |
| 3,221,563 | 12/1965 | Wing | 308/10 |
| 3,262,326 | 7/1966 | Schott | 308/10 |
| 3,334,949 | 8/1967 | Atkinson | 308/10 |
| 3,338,644 | 8/1967 | Atkinson | 308/10 |
| 3,508,445 | 4/1970 | Penny | 308/10 |

Primary Examiner—R. Skudy
Attorney, Agent, or Firm—Arthur A. Smith, Jr.; Robert Shaw; Charles L. Gagnebin, III

[57] ABSTRACT

An electrical suspension for positioning an element with respect to a frame of reference without mechanical connection to the reference. The suspension includes a bridge circuit having opposite bridge leg impedances vary together in response to the gap between an armature attached to the element and a stator attached to the reference frame. The bridge includes a diagonal impedance which acts to redistribute bridge current when the bridge impedances vary with displacement of the element from a centered position. The redistributed current results in an increased current flow through the legs corresponding to the increased gap and the increased current is used to create a restoring force on the element.

26 Claims, 20 Drawing Figures

PATENTED JUL 16 1974  3,823,990

CAPACITIVE-INDUCTIVE BRIDGE TYPE ELECTRICAL SUSPENSION

FIELD OF THE INVENTION

This invention relates to suspension circuits and in particular to a bridge-type electric and magnetic suspension system.

BACKGROUND OF THE INVENTION

In the design of precision instruments, such as gyroscopes for inertial navigation systems, it is common to electromagnetically suspend certain movable instrument elements such as the gyroscope float used to house the rotor. See for example P. J. Gilinson, Jr. U.S. Pat. No. 3,184,271 or A. G. Lautzenhiser U.S. Pat. No. 3,112,962. Such suspensions permit frictionless rotation of the element with respect to its environment and thus increases its sensitivity and accuracy.

A typical electromagnetic suspension includes for each axis, a pair of opposed coils separated by corresponding gaps from the poles of the armature on the element to be suspended. The element will normally be at neutral bouyancy with respect to the stator coils by surrounding the element with a fluid of appropriate density. Each stator coil in the suspension system is typically capacitively tuned and excited at the half power point by an A.C. source. The appropriate half power point is selected such that as the gap for either coil increases and the coil impedance changes, the tune of each coil circuit approaches resonance thereby increasing coil current and correspondingly the force on the element across the gap increases. There results a net restraining force on the element keeping it centered between the stator poles. Three axes of suspension may be employed to maintain the element in a predetermined position and orientation and permit frictionless rotation about an axis.

Because the typical resonant suspension is tuned to the half power point the range of linear restraint for the element is limited to the distance corresponding to one side of the resonance curve. There is in addition substantial quiescent current through each coil when the element is centered due to the tuning effect. This relatively high current produces a corresponding heating in the coil which may have to be accounting for in the instrument. Additionally, the quality factor of both the coil and tuning capacitor affect the centered position of the element and may be difficult to predict in coil or capacitor design and may be subject to variation with time. Moreover, it can be appreciated that a separate tuning capacitor is required for each stator coil.

BRIEF SUMMARY OF THE INVENTION

According to a preferred embodiment of the present invention, a bridge suspension circuit operates to adjust the flow of current among stator impedances to provide centering forces. In a specific implementation, the impedances in a first opposite bridge leg are wound on the same or adjacent poles of a suspension stator. The two other opposite leg impedances are similarly wound on a second pole or poles. The armature of the element to be suspended floats in a gap between the poles. The bridge is excited at a first pair of opposite terminals and an impedance, typically a capacitor, is connected across the other pair of bridge terminals, those which are not excited. An off-centered position of the armature between the stator poles results in a bridge unbalance which directs current through the diagonal impedance to increase the flow of current in the bridge arm where the gap has widened. The increased current increases the coil forces on the armature in a direction tending to restore it to a centered position. Similarly, the coils facing the reduced gap receive less current and create less force which further aids in restoration of the armature.

This structure results in a more desirable shape for the force versus displacement curve and a greater dynamic range for the suspension in maintaining centering of the armature. Additionally, there is a lower quiescent current drain and corresponding lower heat dissipation from the suspension system. A smaller number of additional components are required in the system, and because the suspension is not resonance limited, high quality factor coil cores on the stator may be employed to improve the efficiency of the suspension. Moreover, only one additional capacitor is employed per axis of suspension and there is typically no current flow through the capacitor at the centered position to eliminate the effect of capacitance value on the centered position.

BRIEF DESCRIPTION OF THE DRAWINGS

These and other features of the present invention will be more fully described below in a detailed description of the preferred embodiments presented for purposes of illustration, and not by way of limitation, and in the accompanying drawings of which.

DETAILED DESCRIPTION OF THE PREFERRED EMBODIMENTS

To achieve electromagnetic suspension of the armature of an element between the coils of a stator, without physical contact, several systems have been devised to adjust the electromagnetic force on the armature of each stator coil as the gap between the stator poles and the armature varies. Specifically, the force is reduced as the gap reduces and increased as the gap increases to provide a net restorative force on the armature to a predetermined, normally centered, position. In the prior art, as indicated above, this variation of force with gap has been typically achieved by tuning each stator coil to the upper half power point with a tuning capacitor. As the gap for each coil increases with armature displacement from the centered position, the coil's inductance will decrease shifting the resonant circuit operating point closer to the peak of the resonant curve, and greatly increasing the coil current to provide a net increase in force between the coil and the armature. The opposite effect occurs with the diametrically opposite stator coil which will experience a gap reduction and corresponding force reduction. The net result of the force changes is a restoring force on the armature toward the centered position.

Figure 1:
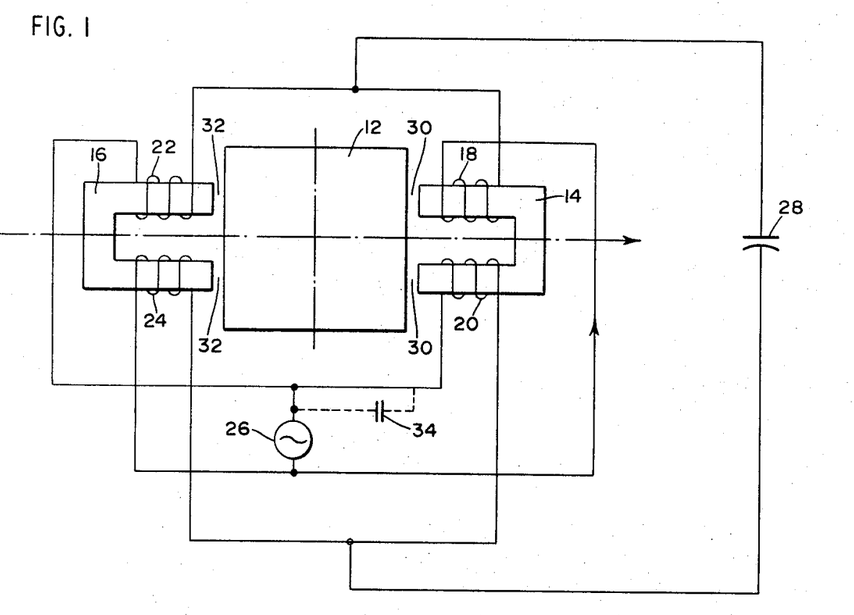
FIG. 1 is a diagramatic view of a single-axis suspension according to the invention.
Figure 2:
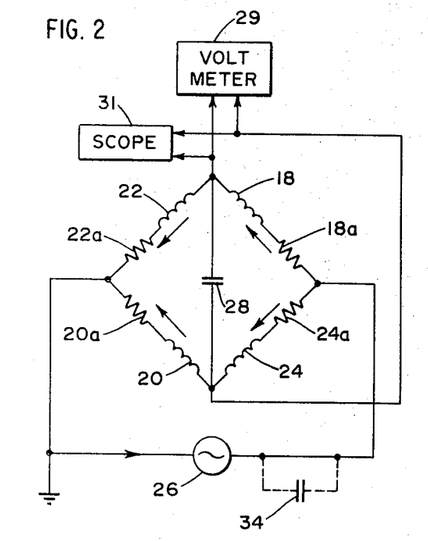
FIG. 2 is a schematic diagram of the corresponding circuitry for the FIG. 1 diagram.

In accordance with the present invention a system for providing a restoring force on the armature, independent of these prior art series resonance principles, is illustrated in FIGS. 1 and 2. In FIG. 1 an armature 12 is diagramatically represented as a block of permeable material. First and second U-shaped stator elements 14 and 16 are oriented with the open portion of the U-shape facing the armature 12 to provide a closed flux path. On each arm of the U-shaped stator elements 14 and 16 are wound respective coils 18; 20 and 22; 24. An A.C. source 26, has one output terminal applied to first terminals of the coils 20 and 22 and the opposite output terminal of the source 26 applied to first terminals of the coils 18 and 24. A capacitor 28 has a first terminal connected in common to second terminals of the coils 18 and 22 and in its second terminal connected in common to second terminals of the coils 20 and 24 which are not directly excited by source 26. A schematic diagram is indcated in FIG. 2 to illustrate the interconnection of the coils with the source 26 and capacitor 28 to form the bridge circuit. Resistance 18a, 20a, 22a and 24a are illustrated in FIG. 2 as representing the coil losses. A typical capacitance C for capacitor 28 is given by the formula:

$1/2\omega c = \omega L - R$ where L and R represent respectively the inductive values of coils 18 – 24 and resistances 18a – 24a, and $\omega$ is $2\pi$ times the frequency of source 26. A voltmeter 29 and oscilloscope 31 are connected across capacitor 28 to indicate armature displacement through the magnitude and phase of the signal across the capacitor 28.

The operation of the circuitry can be best understood by reference to FIG. 1. It will be seen there that each pair of coils 18; 20 and 22; 24, are separated from the armature 12 by respective gaps 30 and 32. If the armature 12 were to move slightly to the left from a centered position, then the gap 30 would increase and the gap 32 would decrease. The increase in the gap 30 would increase the reluctance of the coil flux path for the coils 18 and 20 thereby reducing the coil inductances. Similarly, the reduction in gap 32 will increase the inductances of the coils 22 and 24. With reference now to the bridge circuitry, illustrated in FIG. 2 it can be seen that as the impedance of coils 18 and 20 decreases and the impedance of coils 22 and 24 increases, the capacitor 28 will direct a greater proportion of current through the coils 18 and 20 and a lesser proportion of current through the coils 22 and 24. With the increased current flowing in the coils facing the increased gap, a net restorative force is applied to the armature 12 in a direction tending to return it to its quiescent or central position. It can be appreciated from the circuitry of FIG. 2, that in the quiescent state the capacitor 28 carries no current. As a result, the centered position is not affected by the value of capacitor C which may change with time. Moreover, the suspension is not limited by the resonance curve of the circuitry as in prior art designs so that a wide dynamic range is achieved and high quality factor cores may be used.

In the circuit of FIG. 1, the load for the source 26 appears inductive and requires an increased voltage to maintain a desired quiescent current flow. To reduce the voltage necessary to provide this current, an additional tuning capacitor 34, illustrated in FIG. 2 as an alternative, may be connected directly in series with the source 26 before application to either terminal of the bridge. The tuning also restores the normal phase relationships between the current and the voltage as is desirable.

Figure 3A:
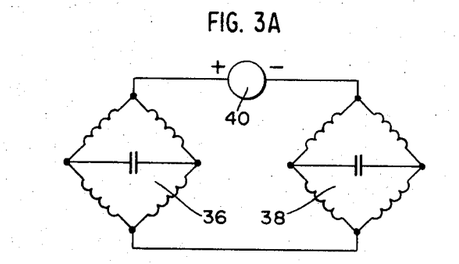
FIGS. 3A and 3B show respectively a two-axis series and parallel suspension employing the concept of the invention.
Figure 3B:
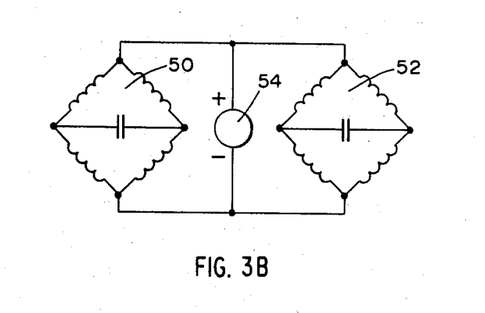
Figure 4:
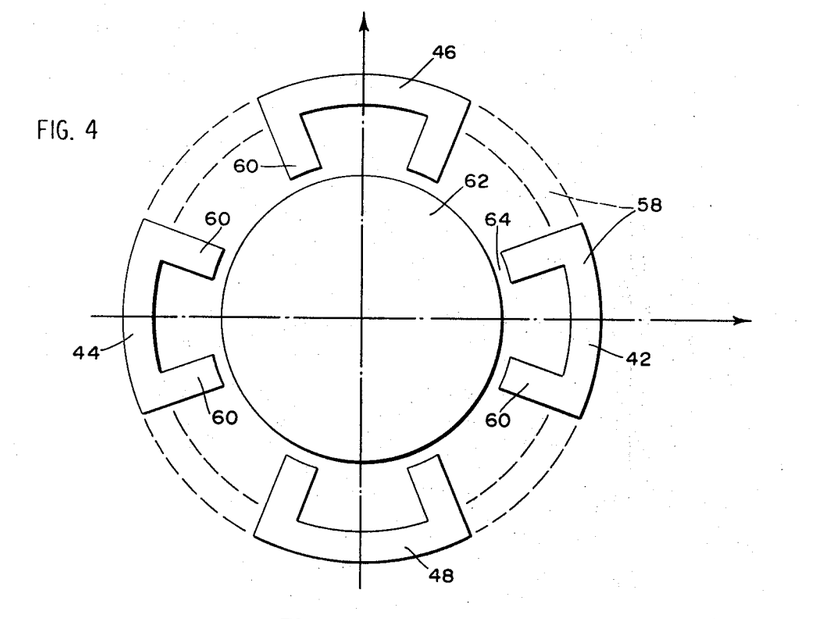
FIGS. 4 and 5 show alternative stator forms for a two-axis suspension according to the invention.

For shorthand notations in future figures it will be convenient to refer to the bridge configuration in FIG. 2 as a predetermined element with opposite terminals thereof excited by a source and the remaining opposite terminals having connected thereacross the current distributing capacitor 28 or other impedance. Using this notation and referring to FIG. 3A a two-axis suspension system is illustrated using a series connection of first and second bridges 36 and 38 from a single source 40. The second axis is provided by a further set of U-shaped stator elements applied along an orthogonal axis of the armature 12 in FIG. 1. This is more clearly shown in FIG. 4 illustrating the typical cylindrical form for the stator and armature that might be employed in a gyroscope for example. In this case, diagonally opposite stator cores 42 and 44 are wound with a first set of four coils for one axis of suspension as in bridge 36 and orthogonally oriented but opposite stator cores 46 and 48 are wound with an additional set of four coils for the second axis of suspension as in bridge 38. The coils are then connected in a bridge circuit according to the descriptions of FIGS. 1 and 2 to form the series connection of FIG. 3A. Coils which form opposite legs of each bridge are typically wound on the same U-shaped core of the stator. in FIG. 3B a parallel connection is shown of first and second bridge circuits 50 and 52 excited from a single source 54 as an alternative form.

Figure 5:
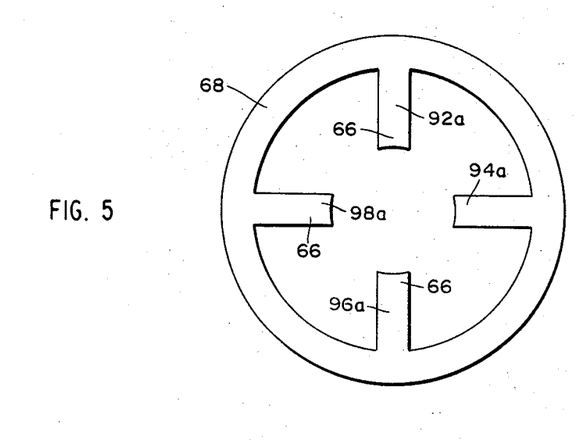

The stator structure illustrated in FIG. 4 as a set of four U-shaped cores 42, 44, 46 and 48 may be replaced by a unitary cylindrical stator shown in FIG. 4 by both the solid and dashed lines together. In that case a unitary cylindrical structure 58 is formed having eight separate poles 60 on which the respective coils are wound. Each pole 60 faces a cylindrical armature 62 across a gap 64. The eight poles of FIG. 4 may be reduced to a four-pole structure as shown in FIG. 5 wherein each pair of coils from opposite bridge legs is wound together on a single one of the poles 66 projecting inward from an annular stator core 68. In the FIG. 5 embodiment the two coils for each pole may be wound either as separate coils or as bifilar coils.

Figure 6:
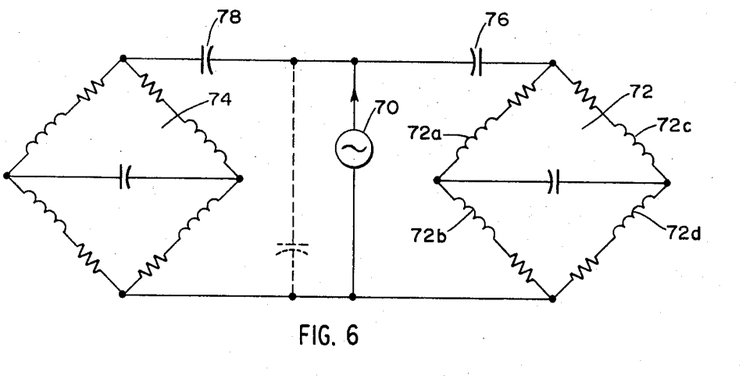
FIG. 6 is a diagram of circuitry useful for the FIG. 5 stator form.

With respect to FIG. 6 a typical circuit is illustrated for use with a stator of the FIG. 5 type. A source 70 provides A.C. excitation to parallel bridges 72 and 74 through respective series capacitors 76 and 78. As before, the convention is maintained that opposite legs of the same bridge are wound as coils on the same pole. Typically, one side of the bridge such as coils 72a and 72b, will be wound as primary coils while the opposite sides 72c and 72d, will be wound as secondary coils. Each bridge provides a single radial axis of suspension.

Figure 7A:
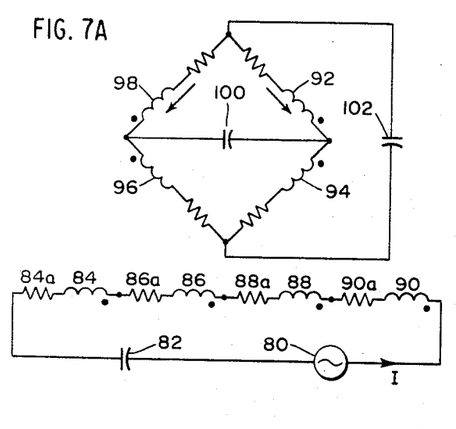
FIGS. 7A and 7B show an alternative circuit for the FIG. 5 stator form for exciting the bridge circuit employed in the invention through inductive coupling.
Figure 7B:
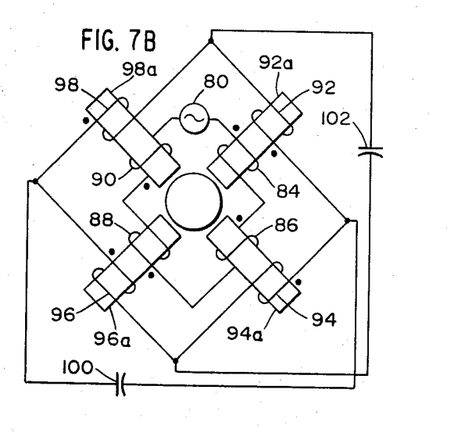

With respect now to FIGS. 7A and 7B, there is shown a form of the invention having a modified system for application of excitation to the coils of the four bridge legs and typically using the FIG. 5 cores. In particular a source 80 provides A.C. excitation through an optional capacitor 82 for tuning purposes to respective series connected primary coils 84, 86, 88 and 90, each having associated coil resistances, 84a, 86a, 88a and 90a. The primaries 84 through 90 are wound on appropriate stator poles to excite secondary coils 92, 94, 96 and 98, respectively, also located on the stator cores. A capacitor 100 provides current distribution between diagonally opposite terminals of the bridge and a further capacitor 102 provides a current distribution between the other opposite terminals of the bridge. The coils 92 through 98 are typically wound on stators of the type shown in FIG. 5, to provide two-axis radial suspension with a single bridge of the type indicated. Capacitors 100 and 102, represented by the value C, will typically be of equal values and in terms of the centered inductance L and resistance R of each coil are of a value as shown in:

$1/2\omega c = \omega L - R$.

The current distribution principle explained with respect to FIGS. 1 and 2 for a single-axis radial suspension applies also to the two-axis suspension of FIG. 7. In this case, individual axis restraint is provided by a combination of adjacent pole variations. Accordingly, with reference to FIGS. 7 and 5 the coil 92 is wound on a stator pole 92a, the coil 94 on pole 94a, coil 96 on pole 96a and coil 98 on pole 98a. The polarity of the coils is as shown in FIGS. 7A and 7B using the conventional dot notation.

Figure 8:
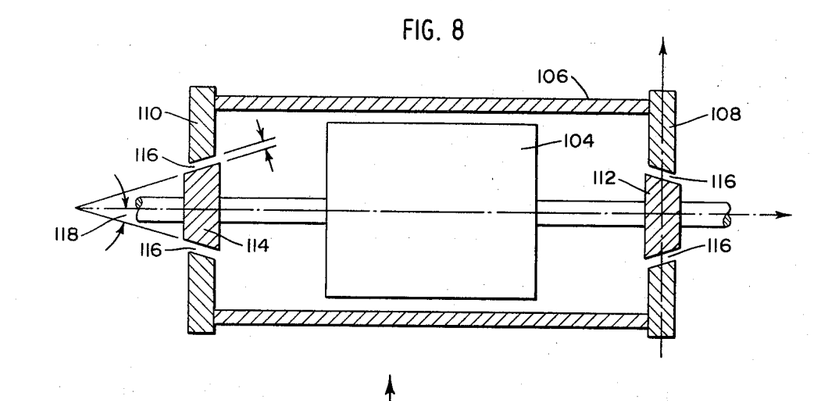
FIGS. 8 and 9 show respectively physical arrangement and circuit diagrams representative of a three-axis suspension according to the invention.
Figure 9:
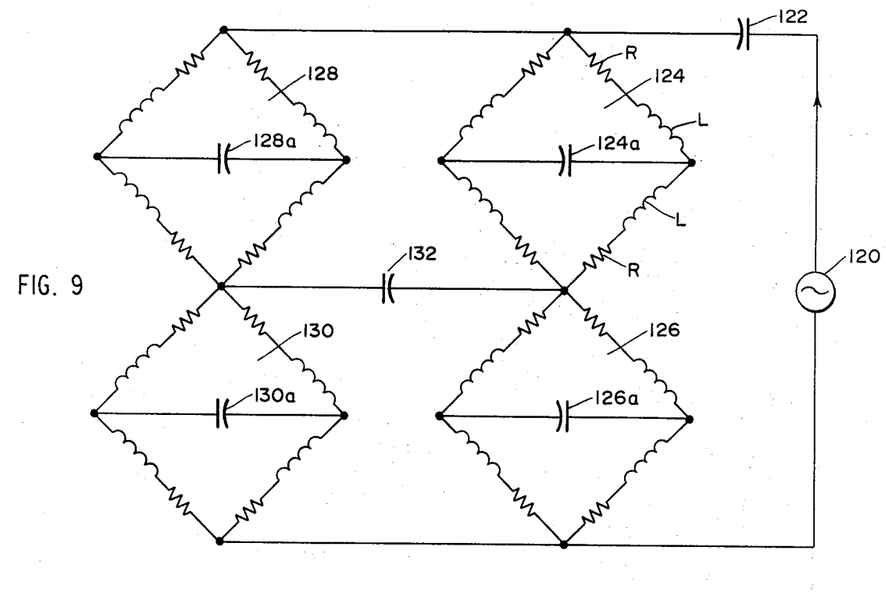

By reference to FIG. 8, the physical layout is illustrated of a system to provide three-axis suspension of a generally cyclindrical element 104 with respect to a cylindrical housing 106. Ends 108 and 110 of the housing 106 form respective stators for suspension of coaxial armatures 112 and 114, respectively. The stators 108 and 110 in end view may resemble the stators of FIG. 4 or FIG. 5. The radially outer peripheries of the armatures 112 and 114 are tapered at an angle 118. The inner faces of the poles for the stators 108 and 110 are similarly tapered to be parallel to the outer periphery of the armatures. Respective gaps 116 separate the faces of the stators and armatures. The taper permits axial as well as radial suspension using the pair of armature and stator combinations shown. The circuitry employed for the coils wound on the stators 108 and 110 is illustrated in FIG. 9, again using the convention that opposite legs of a bridge represent windings on the same or adjacent poles such as poles 66 in FIG. 5. In FIG. 9 a single source of excitation 120 applies current through a phase shifting capacitor 122 to a terminal of a bridge 124 with the opposite terminal thereof connected to a terminal of a further bridge 126. The opposite terminal of bridge 126 is connected to the return for source 120. In parallel with the series connection of bridges 124 and 126 are similarly connected bridges 128 and 130. A capacitor 132 joins the common terminal of the bridges 124 and 126 to the common terminal of the bridges 128 and 130.

For typical operation the capacitor 132 is of a value equal to diagonal capacitors 124a, 126a, 128a and 130a for the respective bridges 124, 126, 128 and 130. The values for these latter capacitors are determined as indicated above.

In a typical arrangement, the bridge 124 forms a Y-axis radial suspension for the stator 108 while the bridge 126 provides Y-axis radial suspension for the stator 110. Correspondingly, the bridges 128 and 130 provide X-axis radial suspension for the stators 110 and 108 respectively. For axial restraint, it can be appreciated that all inductances of the bridges 124 and 130 will change by the same amount in the same direction for axial displacement and that this change will be in a direction opposite to the similar changes for the bridges 128 and 126. Accordingly, the bridges 124, 126, 128 and 130 together form respective arms for a bridge suspension for the axial direction. The capacitor 132 is then operative as the current distributing capacitor for axial restraint.

Figure 10:
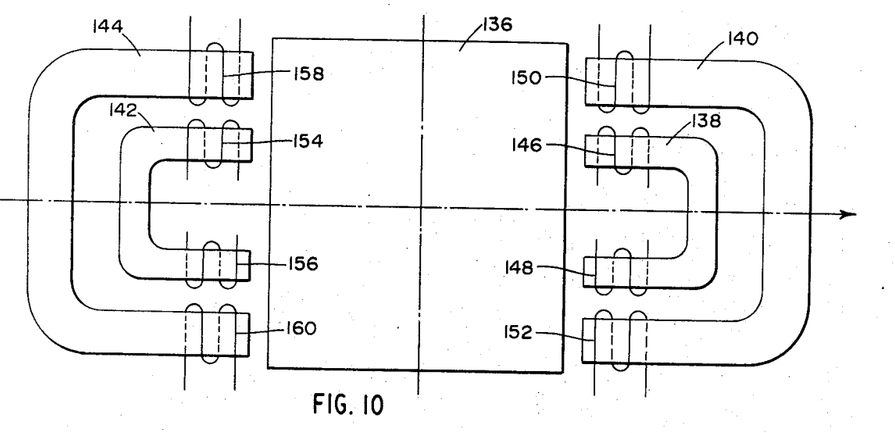
FIGS. 10 and 11 show respectively physical layout and circuit diagrams for a single-axis suspension with separate sense and force stators according to the invention.
Figure 11:
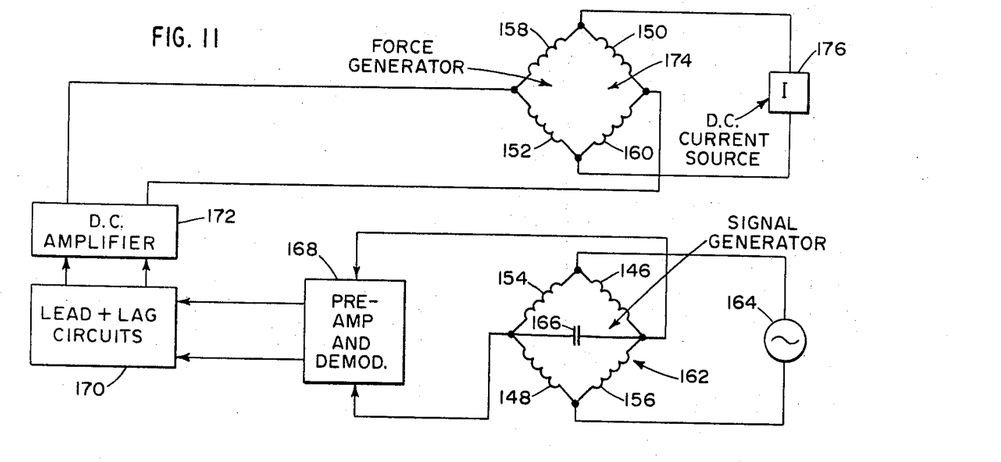

With respect now to FIGS. 10 and 11, an active, feedback suspension using the bridge concept is provided for a single-axis of restraint. With reference to FIG. 10 specifically, a physical coil and pole placement diagram is presented to illustrate the operation of the invention. An element 136, representing the armature, is centered between left and right hand nested pairs of U-shaped stator cores, inner and outer cores 138 and 140 being provided respectively for the right stator portion and inner and outer cores 142 and 144 provided for the left hand portion. The cores are U-shaped in the present case to isolate the flux paths for sense and force functions and balance force and sensing characteristics. The poles of the core 138 have wound thereon respective coils 146 and 148, the poles of core 140 having coils 150 and 152. For core 142 the poles contain respective coils 154 and 156, and the poles of core 144 have respective coils 158 and 160.

The sensing coils are arranged in a bridge circuit indicated in FIG. 11. Physically the coils 146 and 148 provide opposite legs of a bridge 162 for sensing armature displacement while the coils 154 and 156 provide the other pair of opposite legs for the bridge 162. A source 164 provides A.C. excitation to opposite terminals of the bridge 162 and the other pair of opposing terminals have a capacitor 166 connected thereacross. The signal across the capacitor 166 is applied to a preamplifier and synchronous demodulator circuit 168 to provide a D.C. output representative of the magnitude and the direction of the displacement of the armature to lead-lag circuits 170. The lead-lag circuits in 170 provide conventional filtering and damping stabilization of the D.C. signal before application to a D.C. amplifier 172.

The coils for force generation are connected in a bridge 174, the coils 150 and 152 being in opposing legs as are the coils 158 and 160. The terminal defined by the junction between the coils 150 and 158 receives current from a D.C. current source 176, and the return for the source is provided from the terminal between the coils 152 and 160. The output of the D.C. amplifier 172 is supplied to the other pair of opposing terminals of the bridge 174.

In operation it can be seen that as an A.C. signal appears across the capacitor 166 representative of the magnitude of the armature displacement and with a phase indicating the direction of that displacement, there will be provided at the output of the amplifier 172 a demodulated D.C. signal having a magnitude and polarity representative of the armature displacement. That D.C. signal will alter the current flowing through the bridge 174 to increase the current flow through one pair of opposite legs and decrease it through the other pair of opposite legs. The resulting force changes from the coils will produce a net restoring force on the armature element 136 in FIG. 10. The bridge circuit 162 supplies a high sensitivity displacement signal which may be further amplified by the D.C. amplifier 172 and controlled for stability by the lead-lag circuits 170 as is known in the art. Because of the active gain of the circuitry in FIG. 11 a very stiff and precise suspension may be achieved.

Figure 12A:
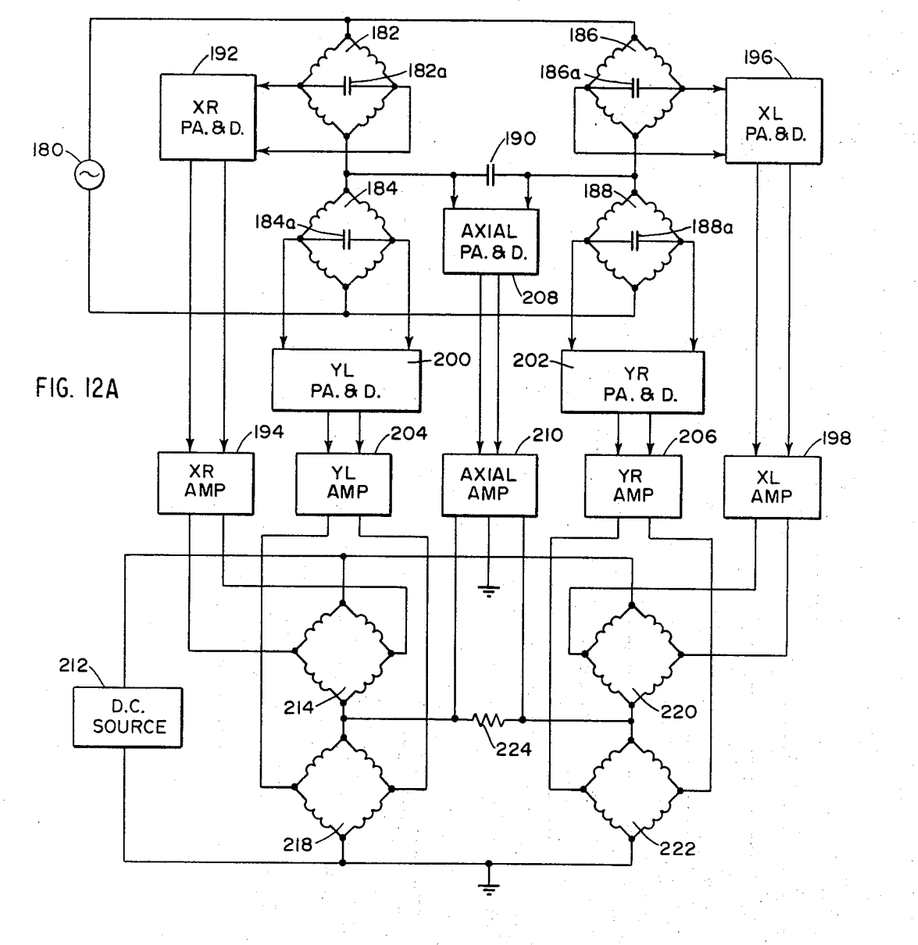
FIGS. 12A and 12B show an active three-axis suspension system according to the invention in circuit and layout form respectively.
Figure 12B:
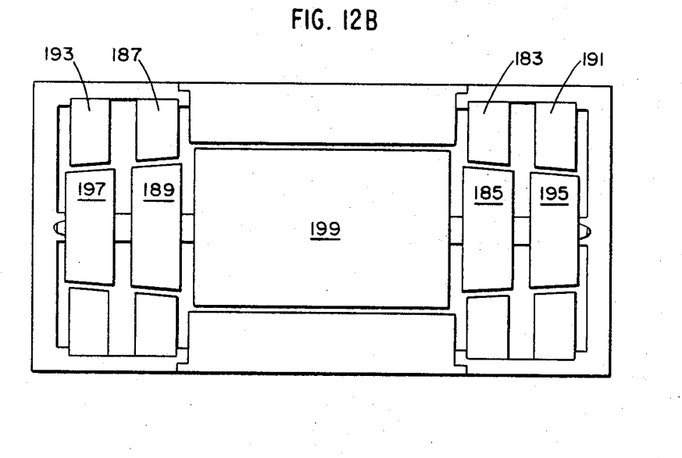

With reference now to FIGS. 12A and 12B, a three-axis bridge-type active suspension is illustrated employing the concepts of FIGS. 8, 9, 10 and 11. FIG. 12B shows a typical three-axis suspension physical layout. In FIG. 12A an A.C. source 180 applies excitation to a four bridge parallel serial combination as indicated in FIG. 9. Bridges 182 and 184 are connected in series as one parallel leg, and bridges 186 and 188 are connected in a series as a second parallel leg. Each bridge has respective capacitors 182a, 184a, 186a and 188a connected across diagonally opposite unexcited terminals. Capacitor 190 connects the junction between bridges 182 and 184 to the junction between bridges 186 and 188. The bridge 182 provides right-hand X-axis radial displacement detection through coils on opposite poles of a stator 183 shown in FIG. 12B. Stator 183 may be either as shown in FIG. 4 or FIG. 5 and senses displacement of an armature 185. The bridge 186 provides left-hand X-axis radial displacement detection through a similar arrangement of coils on a stator 187 in FIG. 12B for sensing position of an armature 189. Similarly, the bridges 184 and 188 provide respectively left-hand and right-hand Y-axis radial displacement detection through coils on the stators 187 and 183 arranged orthogonal to the coils for bridges 182 and 186. As previously indicated, opposite legs of a bridge as for example bridge 182, change in inductance together.

The signal appearing across the capacitor 182a is applied to a right-hand X-axis preamplifier and demodulator circuit 192 and the demodulator D.C. output is applied to corresponding D.C. amplifier 194. The signal across the capacitor 186a is applied to a left-hand X-axis preamplifier and demodulator 196 and in turn to a corresponding D.C. amplifier 198. The signal across capacitors 184a and 188a are similarly applied to left- and right-hand Y-axis preamplifier and demodulator circuits 200 and 202 and to their corresponding amplifiers 204 and 206. The signal across the axial sensing capacitor 190 is applied to an axial preamplifier and demodulator 208 and to an axial amplifier 210.

Corresponding force generation coils are arranged in four parallel, serial combination bridges and wound on force generator stators 191 and 193, each with respective armatures 195 and 197 in FIG. 12B in a fashion similar to the windings for the force coils in FIG. 11. The force coils are excited by a fixed quiescent D.C. current source 212 which applies excitation to a first series pair of bridges 214 and 218 for respectively right-hand X-axis restoration and left-hand Y-axis restoration. In parallel with the bridges 214 and 218 are series connected bridges 220 and 222 which correspond respectively to left-hand X-axis force generating coils and right-hand Y-axis force generating coils. The junction between the bridges 214 and 218 is connected through resistors 224 to the junction between the bridges 220 and 222. The arrangement for windings for the bridges 214 through 222 are typically the same as those for bridges 182–188 indicated for the signal generating portion of the active suspension. For example opposite legs of the bridge 214 for right-hand X-axis force generation would be wound on the same pole of a four pole suspension as indicated in FIG. 5. Because of the D.C. characteristic of the current supplied to the bridges 214 through 222 the impedance 224 is typically a resistor rather than a capacitor as previously employed. It is to be noted that the system of FIG. 12A provides for a complete three-axis suspension for example useful in electromagnetically suspended gyroscope floats such as float 199 in FIG. 12B used to house a rotor. The advantage of the active suspension, as for example stiffness, are accordingly provided with a relatively simple complete three-axis system of the type shown in FIGS. 12A and 12B.

Figure 13:
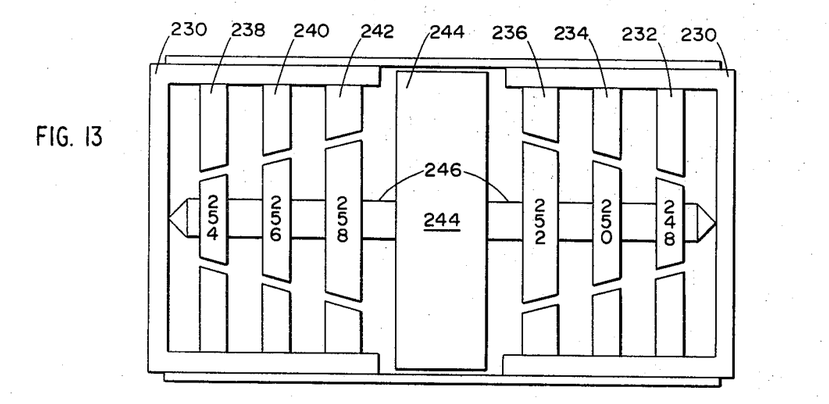
FIGS. 13, 14 and 15 show, according to the invention, respectively physical layout, coil position and circuit diagram for a three-axis active suspension with separate stators for sensing position and rate of change of position and for restoring forces such that a rotating body may be suspended.
Figure 14:
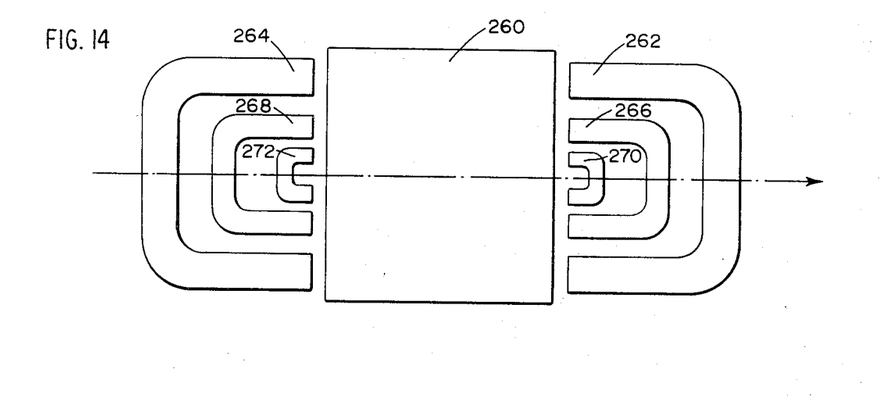
Figure 15:
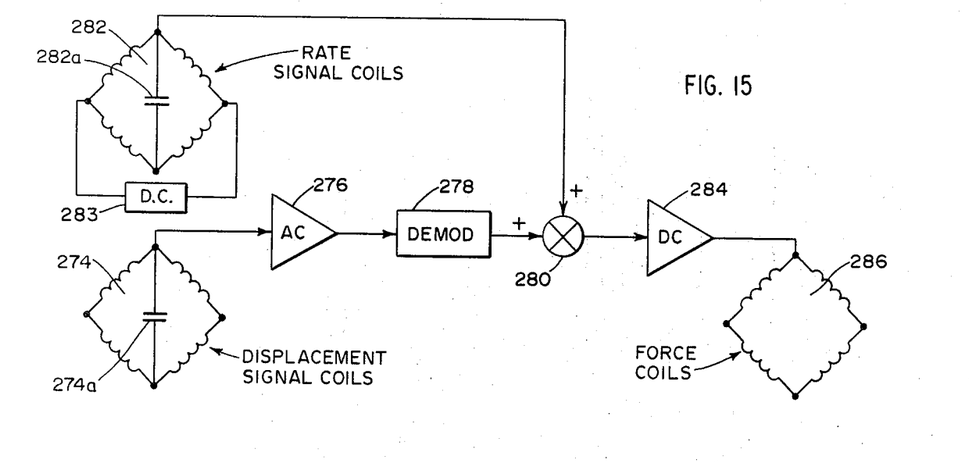

With reference now to FIGS. 13, 14 and 15 the principles indicated above for a bridge type active electromagnetic suspension are applied for a three-axis suspension of a rotating mass. In particular with respect to FIG. 13 a housing 230 for the spinning mass is provided and has on each respective left-hand and right-hand end a set of three stators to provide three axes of displacement signals, rate of displacement signals and magnetic restoration forces. In particular, on the right-hand portion a displacement stator 232 is provided along with a rate of displacement stator 234 and a magnetic force stator 236. On the left, corresponding displacement signal, rate of displacement signal and magnetic force generating stators 238, 240 and 242 are shown. A spinning mass 244 is balanced for rotation on a central shaft 246 which has left-hand and right-hand sets of armatures for the respective stators. In particular armatures 248, 250 and 252 correspond to the stators 232, 234 and 236 and the armatures 254, 256 and 258 correspond to the stators 238, 240 and 242. Each of the stators of FIG. 13 are for exemplary purposes here to be understood to comprise an 8 pole stator of the type shown in FIG. 4.

With reference to FIG. 14 a single, radial-axis left- or right-hand displacement, rate and force generating structure is diagramatically illustrated for purposes of understanding its construction. A rotating element 260 is to be suspended between opposing force generating cores 262 and 264 having two poles each. Nested within the cores 262 and 264 are respective displacement signal cores 266 and 268 and also respective rate of displacement signal cores 270 and 272, each having two poles. In FIG. 15 the circuitry employed is more fully indicated. The displacement signal is sensed across the capacitor 274a of a single-hand, single-axis, signal displacement bridge 274 which has four coils typically wound on cores 266 and 268 in the manner indicated above. The signal is applied through an A.C. amplifier 276 and synchronous A.C. demodulator 278 to a summing amplifier 280. Similarly, across a capacitor 282a in a coil bridge 282 a rate of displacement signal representative of rate of displacement is applied to a further summing junction of summing aplifier 280. Bridge 282 typically has its coils wound on cores 270 and 272. The excitation for the rate of displacement bridge 282 is a D.C. source 283. Bridges 274 and 282 will typically be part of a system similar to the one shown in the top portion of FIG. 12A. The sum output of the summing amplifier 280 is applied to a D.C. amplifier 284 and from the output thereof to a bridge 286 containing the force coils on the poles of the cores 262 and 264. A similar system is employed for the orthogonal radial displacement axis, for the other end of the support system and for axial restraint in a manner similar to that shown in FIGS. 12A and 12B. In brief, the suspension for the rotating mass is derived from the FIGS. 12A and 12B system by the addition of a set of rate of displacement bridges and summing amplifier according to the structure of FIGS. 13, 14, 15. An additional set of four bridges and five summing amplifiers is supplied for the rate of displacement signals for the three-axes of suspension.

Employing the circuitry of FIGS. 13, 14 and 15 a rotating mass may be suspended and dynamically stabilized through the stabilizing feedback provided by the rate of displacement signal.

Figure 16:
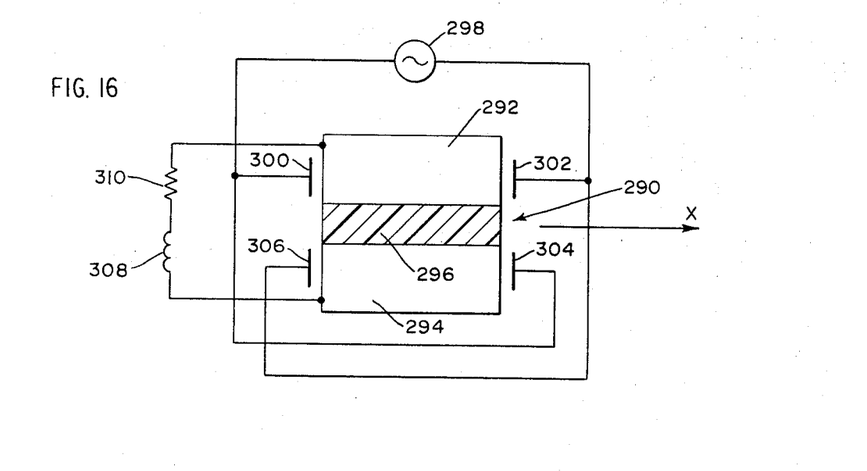
FIGS. 16 and 17 are respectively layout and circuit diagrams representing an electrostatic dual of the present invention.
Figure 17:
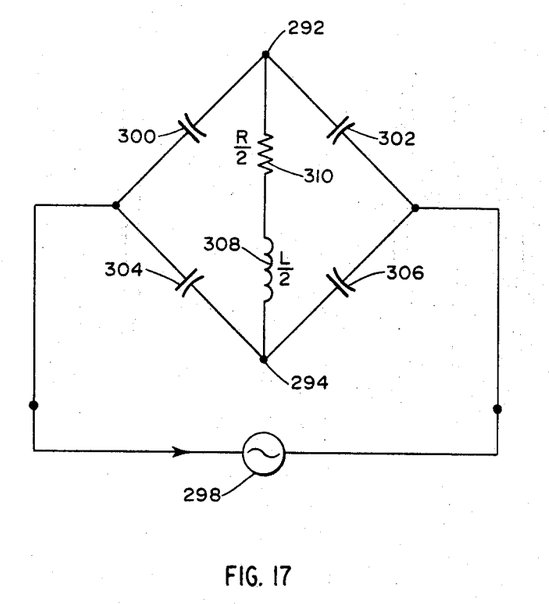

With respect now to FIGS. 16 and 17 respective layout and circuit diagrams are indicated employing electrostatic rather than electromagnetic suspension forces in a bridge configuration according to the invention. An element 290 to be suspended is composed of first and second conductive portions 292 and 294 separated by an insulation layer 296. An A.C. signal source 298 provides excitation through first and second capacitor plates 300 and 302 which face opposite ends of conducting portion 292 across a gap. The plate 300 is connected to a further capacitor plate 304 facing the conducting portion 294 in a sense such that the gap associated with plate 300 increases as the gap associated with plate 304 decreases. Similarly, the plate 302 is connected to a plate 306 facing portion 294 with these same oppositely varying gap relationships. The conducting portions 292 and 294 of the elements 290 are connected through a coil 308 having an associated resistance 310. The coil 308 and resistance 310 combination provide the current distributing or switching impedance previously achieved with a capacitor. The circuit components maintain typically the relationships:

$$\omega L/2 = 1/\omega C - R.$$

The circuit of FIGS. 16 and 17 is the electrical dual of the electromagnet suspension of FIG. 1 and FIG. 2 with the element 290 forming the armature and the plates 300, 302, 304 and 306 comprising the stator. The suspension operates by electrostatic rather than by electromagnetic forces.

Having described above exemplary embodiments of the present invention it will occur to those skilled in the art that modifications and alterations can be made without departing from the spirit of the invention. Accordingly, it is intended to limit the scope of the invention only as indicated in the following claims.

What is claimed is:

1. In an electrical suspension system for maintaining an element in a predetermined position, a circuit comprising:
    first impedance means responsive in impedance to the position of said element;
    second impedance means responsive in impedance to the position of said element;
    means for positioning said first and second impedance means to be oppositely responsive in their respective impedances to the position of said element;
    means for applying electrical excitation to said first and second impedance means; and
    means interconnecting said first and second impedance means for adjusting the distribution of the applied excitation between said first and second impedance means in response to the impedance values of said first and second impedance means.

2. The circuit of claim 1 wherein said distribution adjusting means includes a third impedance means responsive to the impedances of said first and second impedance means to conduct said excitation therebetween, said third impedance means conducting substantially no excitation at said predetermined position for said element.

3. The circuit of claim 2 further including:
    means for sensing the excitation conducted by said third impedance means;
    means responsive to the sensed conduction for applying a force for moving said element in a direction to reduce the conduction of said third impedance means.

4. The circuit of claim 1 wherein:
    said first and second impedance means include first and second means responsive to the excitation applied thereto for generating corresponding opposed forces on said element.

5. The circuit of claim 1 wherein:
    said first and second impedance means include reactances of one type; and
    said distributing means comprises a reactance of the other type;
    said one type of reactance having a current and voltage phase relationship substantially different from the current and voltage phase relationship of the other type of reactance.

6. The circuit of claim 1 wherein:
    said element includes an armature; and
    said first and second impedance means are associated with a stator for said armature.

7. The circuit of claim 1 further including means for providing an output indication of the adjustment in the distribution of the applied excitation.

8. In a multiple-axis suspension system apparatus comprising:
    plural circuits of the type claimed in claim 1 and arranged to sense position of said element along plural axes;
    means for causing the first and second impedance means of a portion of said plural circuits to vary together in impedance in response to the position of said element along one of said plural axes;
    said excitation applying means including means for applying the excitation to said plural circuits; and means for adjusting the distribution of the excitation applied to said plural circuits in accordance with the impedances of said plural circuits.

9. The suspension system of claim 1 wherein said means for adjusting the distribution of applied excitation is interconnected to receive a current therethrough which varies through a zero value as said element varies its position about said predetermined position.

10. A suspension system for maintaining a movable element in a predetermined position, said suspension system including:
first means responsive to excitation for applying a corresponding force on said element in a first direction;
second means responsive to excitation for applying a corresponding force on said element in a second direction opposing said first direction;
said first and second force applying means having a characteristic representative of the position of said element with respect to themselves;
means for distributing excitation to said first and second force applying means; and
means operatively connected between said first and second force applying means for adjusting the distribution of excitation to said first and second force applying means in accordance with said characteristic of said first and second force applying means;
said adjusting means carrying substantially no excitation between said first and second force applying means when said element is at said predetermined position.

11. An electrical suspension system for maintaining a movable element in a predetermined position comprising:
first impedance means responsive to excitation for applying a first force to said element and having the impedance thereof vary in response to the position of said element in the direction of the first applied force;
second impedance means responsive to excitation for applying a second force to said element and having the impedance thereof vary in response to the position of said element in the direction of the second applied force;
means for distributing excitation to said first and second impedance means; and
means for adjusting the distribution of the excitation from said excitation means between said first and second impedance means in response to their impedances.

12. The electrical suspension system of claim 11 wherein:
said first impedance means includes first and second opposite legs of an impedance bridge;
said second impedance means includes third and fourth opposite legs of an impedance bridge; and
said distribution adjusting means includes a first diagonal impedance across a first set of opposite terminals of said impedance bridge.

13. The electrical suspension system of claim 12 wherein:
said distribution adjusting means includes a second diagonal impedance across a second set of opposite terminals of said bridge; and said excitation distributing means includes means for coupling said excitation to each of said first, second, third and fourth legs of said impedance bridge.

14. The electrical suspension system of claim 11 further including:
a stator associated with said first and second impedance means; and
an armature associated with said element for reacting to forces applied by said first and second impedance means.

15. The electrical suspension system of claim 11 wherein said distribution adjusting means includes means for conducting current between said first and second impedance means in response to the position of said element and in a direction representative of the direction of displacement of said element from said predetermined position, said conducting means conducting substantially no current when said element is at said predetermined position.

16. An electrical suspension system for providing suspension of a movable element, said system comprising:

first impedance means having an impedance thereof vary in response to the position of said element;
second impedance means having an impedance thereof vary oppositely to the impedance of said first impedance means in response to the position of said element;
means for distributing excitation to said first and second impedance means;
means for adjusting the distribution of excitation between said first and second impedance means in response to the impedances thereof;
means responsive to the adjustment of excitation for providing a signal representing position of said element;
first force applying means responsive to excitation for applying a first force to said element;
second force applying means responsive to excitation for applying to said element a second force opposing said first force; and
means responsive to said signal for providing the excitation to said first and second force applying means.

17. The electrical suspension system of claim 16 wherein:
said first impedance means includes impedances in opposite legs of an impedance bridge;
said second impedance means includes impedances in other opposite legs of said impedance bridge; and
said adjusting means includes a diagonal impedance connecting opposite terminals of said impedance bridge;
said excitation distributing means includes a source of an alternating signal applied to other opposite terminals of said impedance bridge;
said signal providing means includes means for providing a D.C. representation of the signal across said diagonal impedance;
said first force applying means includes first and second electrical force generating means connected in opposite legs of a bridge configuration;
said second force applying means includes third and fourth electrical force generating means connected in the other opposite legs of said bridge configuration;

means are provided for applying D.C. excitation to opposite terminals of said bridge configuration; and means are provided for applying said D.C. representation to other opposite terminals of said bridge configuration.

18. The electrical suspension system of claim 16 further including:

means for providing a rate signal representing the rate of change of position of said element; and means for combining said rate signal into said position representing signal.

19. The electrical suspension system of claim 18 wherein said rate signal providing means includes:

first and second impedances defining opposite legs of a bridge configuration and varying similarly in impedance in response to the position of said element;

third and fourth impedances defining the other opposite legs of said bridge configuration and varying oppositely to said first and second impedances in response to the position of said element;

means for applying excitation to opposite terminals of said bridge configuration; and means across other opposite terminals of said bridge configuration for providing said rate signal to represent changes in the signal thereacross.

20. An electrical suspension system for suspending a movable element, said system comprising:

first and second force applying means responsive to excitation for applying opposing forces to said element in a first direction;

third and fourth force applying means responsive to excitation for applying opposing forces to said element in a second direction;

a source of excitation;

first, second, third and fourth means for coupling excitation to said first, second, third and fourth force applying means;

means for joining said first, second, third and fourth coupling means in circuit with said source;

means responsive to the position of said element for adjusting the distribution of excitation to said first, second, third and fourth force applying means by the respective coupling means to produce an adjustment in the forces applied to said element to suspend said element in a predetermined position.

21. The electrical suspension system of claim 20 wherein:

a stator is provided;

said first, second, third and fourth force applying means include respective secondary coils on said stator connected in a closed series circuit;

said first, second, third and fourth coupling means include respective primary coils for exciting the respective secondary coils; and said adjusting means includes first and second capacitors diagonally connected across said closed series circuit at the junctions between the coils.

22. An electrical suspension system for maintaining an element in a predetermined position, said suspension system comprising:

a bridge circuit including;

first and second opposite legs which contain first and second coils responsive to electrical excitation for applying a force on said element in a first direction;

means for varying the impedances of said first and second coils in response to element position;

third and fourth opposite legs which contain third and fourth coils responsive to electrical excitation for applying an opposing force on said element;

means for varying the impedances of said third and fourth coils in response to element position;

means for applying electrical excitation to said first, second, third and fourth coils; and a capacitor across opposite terminals of said bridge.

23. The electrical suspension system of claim 22 wherein the capacitance, C, of said capacitor and the inductance L and resistance R of said coil are related by the equation $1/2\omega C = \omega L - R$.

24. In a suspension for suspending an element along plural axes a system comprising:

first, second, third and fourth bridge circuits each comprising:

first, second, third and fourth coils serially connected and forming the respective legs of one of said bridge circuit; and a capacitor connecting diagonally opposite terminals of each of said bridge circuits;

a first stator having on a first opposite set of poles, the coils of said first bridge, the first and third coils thereof being on one side of said first stator and the second and fourth coils thereof being on the opposite side of said first stator;

first, second, third and fourth coils of said second bridge being similarly wound on a second set of opposite poles othogonally disposed with respect to said first set of poles of said first stator;

a second stator having on a first set of opposite poles the coils of said third bridge, the first and third coils of said third bridge being on one side of said second stator and the second and fourth coils of said third bridge being on the opposite side of said second stator;

the first, second, third and fourth coils of said fourth bridge being similarly wound on a second set of opposite poles othogonally disposed with respect to said first set of poles of said second stator;

means for connecting together a predetermined single terminal of said first and third bridges and for connecting together a predetermined single terminal of said second and fourth bridges;

a capacitor connected between the predetermined single terminals joining said bridges;

means for providing excitation to the terminals of said first and third bridges diagonally opposite to the connected terminals thereof and to the terminals of said second and fourth bridges diagonally opposite to the connected terminals thereof; and first and second armatures for said first and second stators;

said first and second armatures and stators having tapered confronting surfaces.

25. The system of claim 24 further including:

first, second, third, fourth and fifth means for respectively sensing signals across the capacitors associated with said first, second, third and fourth bridges and the capacitor connecting the terminals joining said bridges to provide respective first, second, third, fourth and fifth sense signals;

first and second force stators and corresponding first and second force armatures with tapered confronting surfaces;

means responsive to said first, second, third, fourth and fifth sense signals for applying forces between said first and second force stators and said first and second force armatures to move said element in a direction tending to reduce said sense signals.

26. The system of claim 25 wherein:

said element includes a rotating mass;

means are included for sensing the rate of change of position of said rotating mass; and means are provided for combining into said sense signals a representation of the rate of change of position of said rotating mass.

* * * * *

UNITED STATES PATENT OFFICE
CERTIFICATE OF CORRECTION

Patent No. 3,823,990  Dated  July 16, 1974

Inventor(s)  Philip J. Gilinson, Jr.

It is certified that error appears in the above-identified patent and that said Letters Patent are hereby corrected as shown below:

Insert as the second paragraph in the section entitled "ABSTRACT":

--The invention herein described was made in the course of work performed under a contract with the Air Force.--

Signed and sealed this 22nd day of October 1974.

(SEAL)
Attest:

McCOY M. GIBSON JR.
Attesting Officer

C. MARSHALL DANN
Commissioner of Patents